United States Patent
Zha

(10) Patent No.: US 10,288,485 B2
(45) Date of Patent: May 14, 2019

(54) COLORIMETRY CALCULATION METHOD AND CHROMA CALCULATION METHOD FOR DISPLAY

(71) Applicant: Wuhan China Star Optoelectronics Technology Co., Ltd., Wuhan, Hubei (CN)

(72) Inventor: Guowei Zha, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/737,296

(22) PCT Filed: Oct. 20, 2017

(86) PCT No.: PCT/CN2017/106961
§ 371 (c)(1),
(2) Date: Dec. 17, 2017

(87) PCT Pub. No.: WO2018/196299
PCT Pub. Date: Nov. 1, 2018

(65) Prior Publication Data
US 2018/0372545 A1    Dec. 27, 2018

(51) Int. Cl.
*G01J 4/00* (2006.01)
*G01J 3/50* (2006.01)
(Continued)

(52) U.S. Cl.
CPC ............. *G01J 3/506* (2013.01); *G01J 3/0224* (2013.01); *G02B 6/005* (2013.01); *G02B 6/0056* (2013.01);
(Continued)

(58) Field of Classification Search
CPC ...... G01N 21/21; G01N 21/211; G01N 21/23; G01J 4/04; G01J 4/00
(Continued)

(56) References Cited

U.S. PATENT DOCUMENTS

2016/0070137 A1   3/2016   You et al.
2017/0199423 A1   7/2017   Cheng

FOREIGN PATENT DOCUMENTS

CN    106969906 A    7/2017
CN    205103524 U    7/2017
(Continued)

*Primary Examiner* — M D M Rahman
(74) *Attorney, Agent, or Firm* — Andrew C. Cheng

(57) ABSTRACT

The present disclosure discloses a colorimetry calculation method for a display. The display includes a quantum dot backlight module and a first polarizer, wherein the quantum dot backlight module includes a light guide plate, a quantum dot thin film layer, and a backlight. The method obtains the correction spectrum of the quantum dot backlight module, and obtains the true spectrum of the quantum dot backlight module when the first polarizer is arranged on the light exit side of the quantum dot backlight module based on the correction spectrum and the measurement spectrum, that is, the modified spectrum, so as to accurately simulate the chromatic offset phenomenon due to the secondary excitation of the first polarizer, and provide the basis for the quantitative design of the display including the quantum dot backlight module. The present disclosure also discloses a chromaticity calculation method of a display.

4 Claims, 4 Drawing Sheets

Arranging the first polarizer on the light exit side of the quantum dot backlight module, measuring the quantum dot backlight module, and obtaining a measurement spectrum of the quantum dot backlight module to calculate a first measurement coordinate of the chromaticity of the display based on the measurement spectrum — S5041

Arranging the liquid crystal panel on the light exit side of the quantum dot backlight module and measuring the quantum dot backlight module to obtain a second measurement coordinate of the chromaticity of the display — S5042

Calculating a color coordinate correction factor based on the first measurement coordinates and the second measurement coordinates — S5043

(51) Int. Cl.
  *F21V 8/00*    (2006.01)
  *G02F 1/13*    (2006.01)
  *G01J 3/02*    (2006.01)
  *G02F 1/1335*   (2006.01)

(52) U.S. Cl.
  CPC ...... *G02F 1/1309* (2013.01); *G02F 1/133528* (2013.01); *G02F 2001/133531* (2013.01); *G02F 2202/36* (2013.01)

(58) Field of Classification Search
  USPC .......................................................... 356/364
  See application file for complete search history.

(56) References Cited

FOREIGN PATENT DOCUMENTS

| | | |
|---|---|---|
| JP | 11311710 A | 11/1999 |
| JP | 2006251812 A | 9/2006 |

COLORIMETRY CALCULATION METHOD AND CHROMA CALCULATION METHOD FOR DISPLAY

FIELD OF THE DISCLOSURE

The present disclosure relates to a display technology field, and more particularly to a colorimetry calculation method and a chroma calculation method for a display.

BACKGROUND OF THE DISCLOSURE

Currently used to improve the color gamut of the small size of the display, the more promising application is using a quantum dot film (QD film) to excite the RG by the blue LED, wherein the width of the light line of the QD is about 30 nm, the narrow line width guarantees the true color of the backlight. In a backlight module containing a quantum dot film (also known as quantum dot backlight module), the blue LED is encapsulated on the light entrance side of the light guide plate, and the quantum dot film is usually placed on the light exit side of the light guide plate. When the quantum dot backlight module is in operation, the light source emitted by the blue LED through the lower polarizer containing the APCF below the liquid crystal cell structure will be re-through the quantum dot film, which leads to the secondary excitation problem of the quantum dots, so that the spectrum of the backlight changes. However, the panel manufacturer in the quantum dot film with color resistance design, usually need accurate spectral spectrum to carry out simulation calculations, and because the existence of secondary excitation makes the measured spectrum cannot be directly used for calculation, and the spectral variation due to the secondary excitation causes the relevant chromaticity index calculated by the backlight module to deviate from the final measured value.

SUMMARY OF THE DISCLOSURE

The object of the present disclosure is to provide a colorimetry calculation method and a chroma calculation method for a display. Solve the problem of inaccurate spectrum caused by APCF-containing lower polarizers when using quantum dot backlight modules in existing displays to improve color gamut, and then provide a basis for quantitative design of the display.

The technical proposal of the disclosure to solve the above technical problem is to provide a colorimetric calculation method of a display, wherein the display includes a quantum dot backlight module and a first polarizer arranged on the light exit side of the quantum dot backlight module, wherein the quantum dot backlight module includes a light guide plate, a quantum dot thin film layer arranged on the light exit side of the light guide plate, and a backlight arranged on the light entrance side of the light guide plate; the method including: providing a reference polarizer, wherein the reference polarizer is different from the first polarizer; measuring the quantum dot backlight module by the reference polarizer and the first polarizer, respectively, to extract a correction spectrum caused by the first polarizer in the display; measuring the quantum dot backlight module to obtain a measurement spectrum of the quantum dot backlight module; obtaining a modified spectrum of the quantum dot backlight module based on the measured spectrum and the correction spectrum; and using the modified spectrum to calculate the chromaticity, brightness, and color gamut of the display; wherein the measuring the quantum dot backlight module by the reference polarizer and the first polarizer to extract a correction spectrum caused by the first polarizer in the display including: arranging the first polarizer on the light exit side of the quantum dot backlight module and measuring the quantum dot backlight module to obtain a first spectrum of the quantum dot backlight module; arranging the reference polarizer to the light exit side of the quantum dot backlight module and measuring the quantum dot backlight module to obtain a second spectrum of the quantum dot backlight module; and calculating the correction spectrum based on the first spectrum and the second spectrum; wherein the first polarizer includes an APCF and a polarizer, and the reference polarizer includes only a polarizer; wherein the obtaining a modified spectrum of the quantum dot backlight module based on the measured spectrum and the correction spectrum, including: multiplying the measured spectrum with the correction spectrum to obtain the modified spectrum.

According to another aspect of the present disclosure, there is provided a colorimetric calculating method for a display. The display includes a quantum dot backlight module and a first polarizer arranged on the light exit side of the quantum dot backlight module, wherein the quantum dot backlight module includes a light guide plate, a quantum dot thin film layer arranged on the light exit side of the light guide plate, and a backlight arranged on the light entrance side of the light guide plate; the method including: providing a reference polarizer, wherein the reference polarizer is different from the first polarizer; measuring the quantum dot backlight module by the reference polarizer and the first polarizer, respectively, to extract a correction spectrum caused by the first polarizer in the display; measuring the quantum dot backlight module to obtain a measurement spectrum of the quantum dot backlight module; obtaining a modified spectrum of the quantum dot backlight module based on the measured spectrum and the correction spectrum; and using the modified spectrum to calculate the chromaticity, brightness, and color gamut of the display.

According to another aspect of the present disclosure, there is provided a chroma calculation method for a display. The display includes a quantum dot backlight module and a first polarizer arranged on the light exit side of the quantum dot backlight module, wherein the quantum dot backlight module includes a light guide plate, a quantum dot thin film layer arranged on one side of the light guide plate, and a backlight provided on the side of the light guide plate; the method including: providing a liquid crystal panel; measuring the quantum dot backlight module by the liquid crystal panel and the first polarizer to obtain a color coordinate correction factor in the display; and calculating the corrected chromaticity coordinates of the display based on the color coordinate correction factor.

The beneficial effects of the present disclosure are: the disclosure adopts the reference polarizer to obtain the correction spectrum of the quantum dot backlight module for the secondary excitation problem of the quantum dot film caused by the first polarizer in the display, and corrects the spectrum of the backlight of the display. Accurately simulates the chromaticity offset phenomenon due to the secondary excitation of the first polarizer, providing the basis for the quantification design of the display containing the quantum dot backlight module. In addition, the chromaticity coordinate correction factor is obtained, and the chromaticity due to the secondary excitation of the first polarizer is corrected to improve the accuracy of the chromaticity and provide the basis for the quantization design of the display.

BRIEF DESCRIPTION OF THE DRAWINGS

The disclosure will now be further described with reference to the accompanying drawings and the embodiments.

DETAILED DESCRIPTION OF PREFERRED EMBODIMENTS

The technical solution of the present disclosure will be described in further detail below with reference to the accompanying drawings and specific embodiments in order to provide a better understanding of the technical solution of the present disclosure by those skilled in the art.

Figure 1:
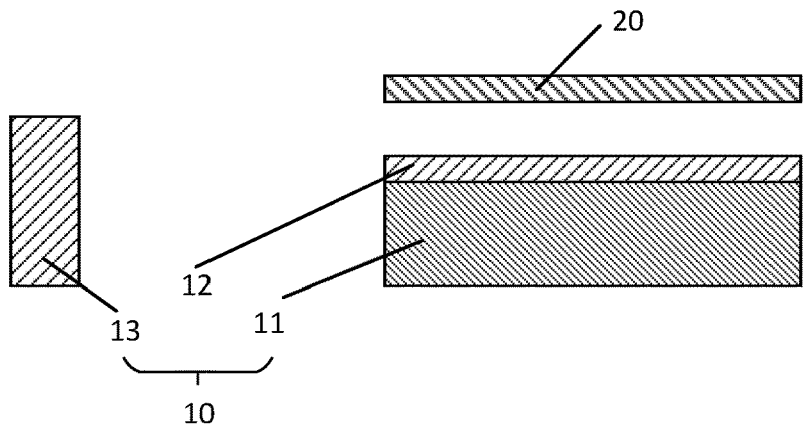
FIG. 1 is a schematic structural diagram of a display used in the present disclosure.

In order to provide a detailed description of the colorimetry calculation method of the display of the present disclosure, the display of the colorimetry calculation method will be described in detail. As shown in FIG. 1, FIG. 1 is a schematic structural diagram of a display used in the present disclosure. The display includes a quantum dot backlight module 10 and a first polarizer 20 arranged on the light exit side of the quantum dot backlight module 10, wherein the quantum dot backlight module 10 includes a light guide plate 11, a quantum dot thin film layer 12 arranged on the light exit side of the light guide plate 11, and a backlight 13 arranged on the light entrance side of the light guide plate 11. As described above, since the first polarizer 20 is located on the light exit side of the quantum dot backlight module 10, the secondary excitation problem of the quantum dot is caused such that the spectrum of the backlight changes and deviates at the design of the color resistive thickness, the colorimetry calculation method will be described below to solve the problem caused by the secondary excitation of quantum dots.

In one embodiment, the first polarizer 20 is arranged on a glass substrate (not shown), the first polarizer can be attached to one side of the glass substrate by pasting. When the first polarizer 20 is provided on the light exit side of the quantum dot backlight module 10, the glass substrate is arranged on the light exit side of the quantum dot backlight module 10. At the same time, the one side of the glass substrate attached with the first polarizer 20 faces the light exit side of the quantum dot backlight module 10.

It is to be noted that the display 100 may also include other components, such as a reflector, and the like, and other components, such as a luminance gain layer, may be provided between the first polarizer 20 and the quantum dot film layer 12, and are not limited in the present disclosure.

Figure 2:
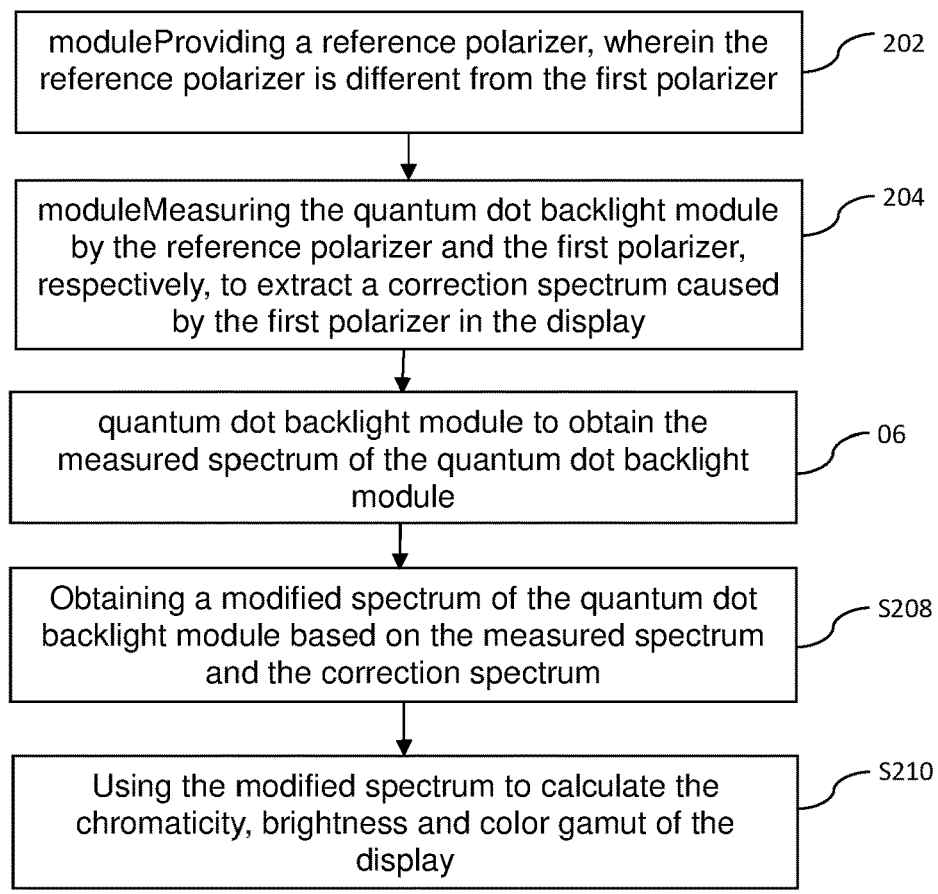
FIG. 2 is a schematic flow diagram of an embodiment of the colorimetry calculation method of the display of the present disclosure.

As shown in FIG. 2, FIG. 2 is a schematic flow diagram of an embodiment of the colorimetry calculation method of the display of the present disclosure. The method is applied to the design process of the display. The display is shown in FIG. 1 and reference to FIGS. 1 and 4, the method includes the steps of:

Step S202: providing a reference polarizer, wherein the reference polarizer is different from the first polarizer.

When the reference polarizer 30 is used, the reference polarizer 30 is provided on a glass substrate (not shown), and the reference polarizer 30 can be attached to one side of the glass substrate by pasting. When the reference polarizer 30 is attached to the side of the glass substrate, it is necessary to remove the first polarizer 20 on the side of the original glass substrate from the glass substrate. Of course, in other embodiments, when the reference polarizer 30 is used, the glass substrate attached with the reference polarizer 30 and the glass substrate attached with the first polarizer 20 are two identical glass substrate.

In one embodiment, the reference polarizer 30 contains only a polarizer, and the first polarizer 20 includes APCF and a polarizer, wherein APCF is a brightness enhancement film, i.e., a brightness enhancement film.

In one embodiment, the display further includes a liquid crystal cell structure (not shown), at which time the first polarizer 20 and the reference polarizer 30 coincide with the lower partial absorption axis of the liquid crystal cell structure, respectively.

Step S204: measuring the quantum dot backlight module by the reference polarizer and the first polarizer, respectively, to extract a correction spectrum caused by the first polarizer in the display.

Figure 3:
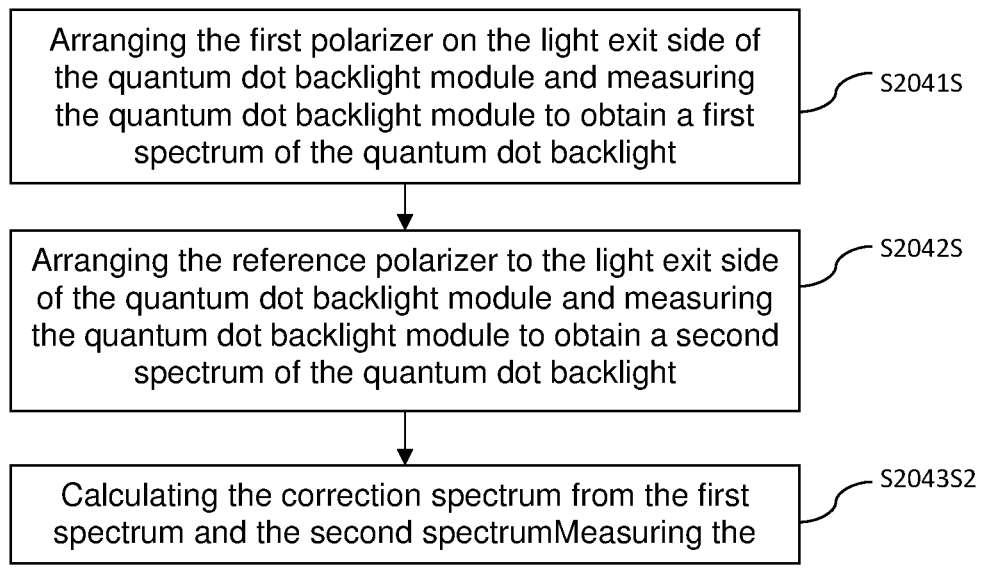
FIG. 3 is a detailed flow diagram of step S204 in the embodiment of the present disclosure.

In one embodiment, as shown in FIG. 3, the step S204 specifically includes:

Step S2041: arranging the first polarizer on the light exit side of the quantum dot backlight module and measuring the quantum dot backlight module to obtain a first spectrum of the quantum dot backlight module.

In this step, the first polarizer 20 is arranged on the light exit side of the quantum dot backlight module 10, and then the quantum dot backlight module 10 is measured, that is, measuring the display in the FIG. 1 to obtain the first spectrum of the quantum dot backlight module 10. Wherein the measuring point backlight module 10 is measured using an apparatus according to the art, for example, an optical spectrum analyzer or the like. In the present embodiment, the first polarizer 20 is provided on the side of the glass substrate and the glass substrate is arranged on the light exit side of the quantum dot backlight module 10. Further, the first polarizer 20 is arranged on the light exit side of the quantum dot backlight module 10. Of course, in other embodiments, the first polarizer 20 may be fused on one side of the glass substrate by other means, for example.

Step S2042: arranging the reference polarizer to the light exit side of the quantum dot backlight module and measuring the quantum dot backlight module to obtain a second spectrum of the quantum dot backlight module.

Figure 4:
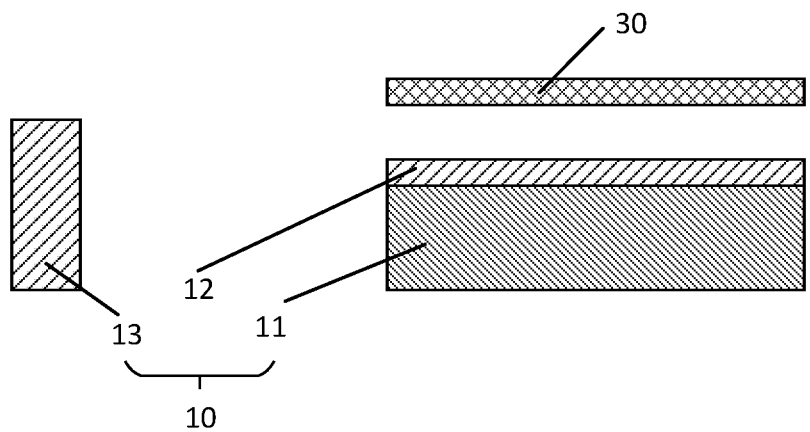
FIG. 4 is a schematic structural diagram when the first polarizer in FIG. 1 is replaced with a reference polarizer.

On the basis of step S2041, the first polarizer 20 is first evacuated from the light exit side of the quantum dot backlight module 10, and the reference polarizer 30 is arranged on the light exit side of the quantum dot backlight module, as shown in FIG. 4. In the present embodiment, the reference polarizer 30 is arranged on the side of the glass substrate and the glass substrate is arranged on the light exit side of the quantum dot backlight module 10, thereby providing the reference polarizer 30 on the light exit side of the quantum dot backlight module.

In one embodiment, when only one glass substrate is used, after the step S2041 is performed, the first polarizer 20 is removed from the glass substrate, and then the reference polarizer 30 is attached to the glass substrate, thereafter, the step S2042 is executed. In other embodiments, when a plurality of glass substrates are used, after the step S2041 is executed, the glass substrate of the first polarizer 20 attached is evacuated from the light exit side of the quantum dot backlight module 10, and then the glass substrate of the reference polarizer 30 attached is provided on the light exit side of the quantum dot backlight module 10, further, the step S2042 is performed.

Step S2043: calculating the correction spectrum from the first spectrum and the second spectrum.

In the present embodiment, the correction spectrum is calculated as: a=b/c, where a represents the correction spectrum, b represents the first spectrum, and c represents the second spectrum.

Step S206: measuring the quantum dot backlight module to obtain the measured spectrum of the quantum dot backlight module.

The quantum dot backlight module 10 is measured and the first polarizer shown in FIG. 1 is evacuated from the light exit side of the quantum dot backlight module, and only the quantum dot backlight module 10 is measured.

Step S208: obtaining a modified spectrum of the quantum dot backlight module based on the measured spectrum and the correction spectrum.

In the present embodiment, the step S208 includes multiplying the measured spectrum and the correction spectrum to obtain a modified spectrum.

Step S210: using the modified spectrum to calculate the chromaticity, brightness and color gamut of the display.

In the present embodiment, the step S210 includes multiplying the modified spectrum by the transmittance spectrum of the red, green and blue colors in the liquid crystal cell structure, respectively, to calculate the chromaticity, brightness and color gamut of the display. The chromaticity, brightness and color gamut of the display are calculated using the traditional colorimetry calculation method in the field after multiplying the modified spectrum with the red, green and blue transmittance spectrum in the liquid crystal cell structure, respectively, wherein, the conventional colorimetry calculation method is not described in the context of those skilled in the art.

It is reviewed that the correction spectrum of the quantum dot backlight module is obtained by a reference polarizer different from the first polarizer. And obtains the true spectrum of the quantum dot backlight module when the first polarizer is arranged on the light exit side of the quantum dot backlight module based on the correction spectrum and the measurement spectrum obtained by measuring only the dots backlight module. That is, the correction spectrum, so as to accurately simulate the chromatic offset phenomenon due to the secondary excitation of the first polarizer, and provide the basis for the quantitative design of the display including the quantum dot backlight module.

Figure 5:
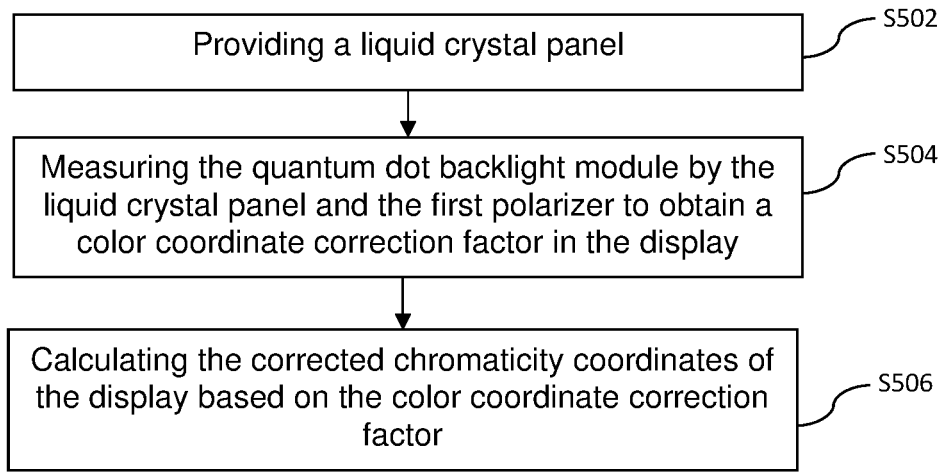
FIG. 5 is a flow chart of an embodiment of the chromaticity calculation method of the display of the present disclosure.

As shown in FIG. 5, FIG. 5 is a flow chart of an embodiment of the chromaticity calculation method of the display of the present disclosure. This method is applied to the design process of the display. The display is shown in FIG. 1, and with reference to FIGS. 1 and 7, the method includes the steps of:

Step S502: providing a liquid crystal panel.

The liquid crystal panel 40 is not shown in FIG. 1, and in use, the liquid crystal panel 40 is disposed above the first polarizer in FIG. 1. The liquid crystal panel 40 includes liquid crystal or the like, and is not described in the scope of the understanding of those skilled in the art.

Step S504: measuring the quantum dot backlight module by the liquid crystal panel and the first polarizer to obtain a color coordinate correction factor in the display.

Figure 6:
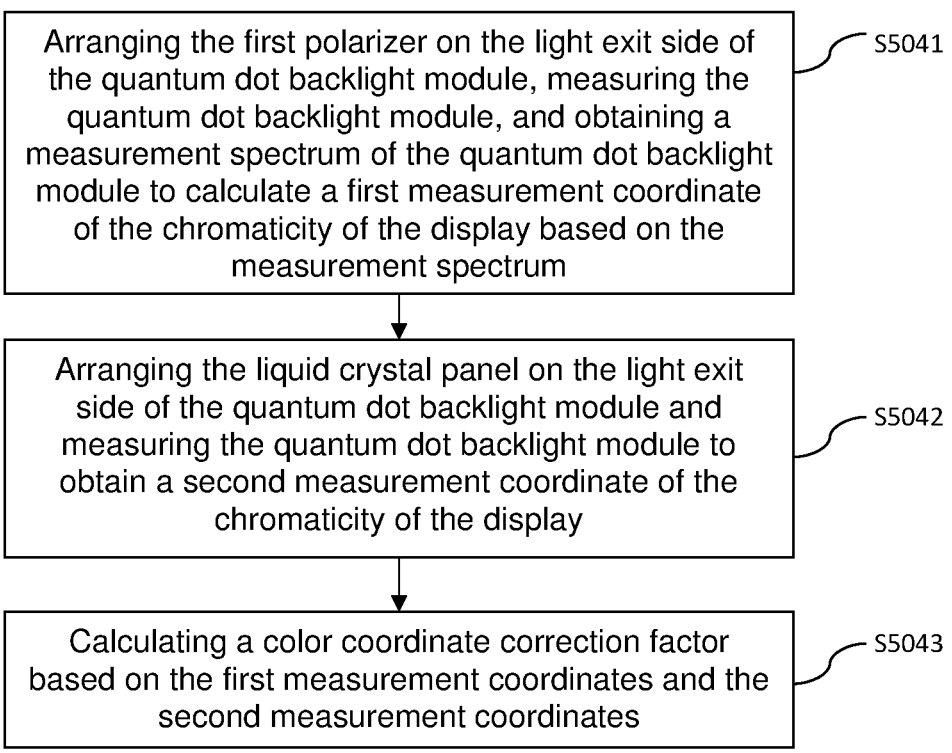
FIG. 6 is a detailed flow diagram of step S504 in the embodiment of the present disclosure.

The first polarizer 20 includes an APCF and a polarizer. As shown in FIG. 1, the first polarizer 20 causes a secondary excitation problem of the quantum dot film, so that the color coordinates are inaccurate. Specifically, in one embodiment, as shown in FIG. 6, the step S504 includes:

Step S5041: arranging the first polarizer on the light exit side of the quantum dot backlight module, measuring the quantum dot backlight module, and obtaining a measurement spectrum of the quantum dot backlight module to calculate a first measurement coordinate of the chromaticity of the display based on the measurement spectrum.

In this step, the liquid crystal panel 40 is provided on the light exit side of the quantum dot backlight module 10, and then the quantum dot backlight module 10 is measured, that is, the display in FIG. 1 is measured.

Further, calculating the first measurement coordinates of the chromaticity of the display based on the measurement spectrum includes multiplying the measured spectrum with the transmittance spectrum of red, green and blue in the liquid crystal panel to calculate the first measurement coordinates of the chromaticity of the display. After the measurement spectrum and the transmittance frequency are multiplied, the first measurement coordinate of the chromaticity is calculated by the conventional chromaticity calculation method, and is not described in the scope of the understanding of those skilled in the art. Among them, the first measurement coordinates using CIE1976 coordinates to represent.

Step S5042: arranging the liquid crystal panel on the light exit side of the quantum dot backlight module and measuring the quantum dot backlight module to obtain a second measurement coordinate of the chromaticity of the display.

Figure 7:
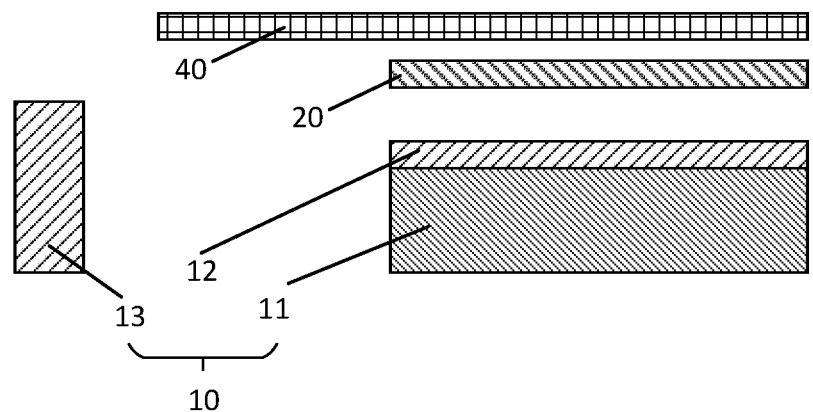
FIG. 7 is a schematic structural diagram of adding liquid crystal panel based on the FIG. 1.

On the basis of step S5041, while the liquid crystal panel is arranged on the light exit side of the quantum dot backlight module, the liquid crystal panel 40 is arranged above the first polarizer 20, as shown in FIG. 7, further, the quantum dot backlight module 10 is measured to obtain a second measurement coordinate of the chromaticity, wherein the second measurement coordinate is represented by CIE1976 coordinates.

Step S5043: calculating a color coordinate correction factor based on the first measurement coordinates and the second measurement coordinates.

In the present embodiment, the color coordinate correction factor is calculated as: $\Delta Ru = Ru' - Ru$, where $\Delta Ru$ denotes the color coordinate correction factor, $Ru'$ denotes the second measurement coordinate, and $Ru$ denotes the first measurement coordinate.

Step S506: calculating the corrected chromaticity coordinates of the display based on the color coordinate correction factor.

Specifically, in one embodiment, the step S506 includes adding the first measurement coordinate and the color coordinate correction factor to calculate the corrected chromaticity coordinates.

In this embodiment, the color coordinate correction factor is obtained by matching the liquid crystal panel, and the measurement coordinates obtained by measuring the first polarizer and the quantum dot backlight module are corrected to calculate the corrected chromaticity coordinates. Thereby accurately simulating the chromaticity offset phenomenon due to the secondary excitation of the first polarizer, providing a basis for the quantitative design of the display including the quantum dot backlight module.

The foregoing is merely an embodiment of the present disclosure and is not intended to limit the scope of the disclosure, any equivalence or equivalent process transformation made using the present specification and the accompanying drawings, either directly or indirectly, in other related technical fields, is likewise included in the scope of patent protection of the present disclosure.

What is claimed is:

1. A colorimetric calculation method for a display, wherein the display comprises a quantum dot backlight module and a first polarizer arranged on the light exit side of the quantum dot backlight module, wherein the quantum dot backlight module comprises a light guide plate, a quantum dot thin film layer arranged on the light exit side of the light guide plate, and a backlight arranged on the light entrance side of the light guide plate;

the method comprising:
  providing a reference polarizer, wherein the reference polarizer is different from the first polarizer;
  measuring the quantum dot backlight module by the reference polarizer and the first polarizer, respectively, to extract a correction spectrum caused by the first polarizer in the display;
  measuring the quantum dot backlight module to obtain a measurement spectrum of the quantum dot backlight module;
  obtaining a modified spectrum of the quantum dot backlight module based on the measured spectrum and the correction spectrum; and
  using the modified spectrum to calculate the chromaticity, brightness, and color gamut of the display;
  wherein the measuring the quantum dot backlight module by the reference polarizer and the first polarizer to extract a correction spectrum caused by the first polarizer in the display comprising:
  arranging the first polarizer on the light exit side of the quantum dot backlight module and measuring the quantum dot backlight module to obtain a first spectrum of the quantum dot backlight module;
  arranging the reference polarizer to the light exit side of the quantum dot backlight module and measuring the quantum dot backlight module to obtain a second spectrum of the quantum dot backlight module; and
  calculating the correction spectrum based on the first spectrum and the second spectrum;
  wherein the first polarizer comprises an advanced polarization conversion film (APCF) and a polarizer, and the reference polarizer comprises only a polarizer;
  wherein the obtaining a modified spectrum of the quantum dot backlight module based on the measured spectrum and the correction spectrum, comprising:
  multiplying the measured spectrum with the correction spectrum to obtain the modified spectrum.

2. The method according to claim 1, wherein the correction spectrum is calculated as: a=b/c, wherein a represents the correction spectrum, b represents the first spectrum, and c represents the second spectrum.

3. The method according to claim 1, wherein the display further comprises a liquid crystal cell structure;
  wherein the first polarizing plate and the reference polarizing plate coincide with a lower polarizing absorption axis of the liquid crystal cell structure, respectively.

4. The method according to claim 3, wherein the chromaticity, brightness, and color gamut of the display are calculated using the correction spectrum, comprising:
  multiplying the modified spectrum with the transmittance spectrum of red, green and blue in the liquid crystal cell structure, respectively, to calculate the chromaticity, luminance and color gamut of the display.

* * * * *